United States Statutory Invention Registration [19]

[11] Reg. Number: H314

Betts [43] Published: Aug. 4, 1987

[54] SAFETY CONTAINER FOR TRANSPORTING SMALL QUANTITIES OF EXPLOSIVES

[75] Inventor: Robert E. Betts, Huntsville, Ala.

[73] Assignee: The United States of America as represented by the Secretary of the Army, Washington, D.C.

[21] Appl. No.: 1,943

[22] Filed: Dec. 18, 1986

[51] Int. Cl.[4] ..... B65D 81/02; B65D 85/30

[52] U.S. Cl. ..... 206/523

*Primary Examiner*—Deborah L. Kyle
*Assistant Examiner*—Michael J. Carone
*Attorney, Agent, or Firm*—John C. Garvin, Jr.; Freddie M. Bush; James T. Deaton

[57] ABSTRACT

A safety container for transporting small quantities of explosives that include a metal bottle that has a bottom and top section that are secured together with seal means therebetween and a cavity of the bottle has anti-static foam plastic material therein with a cavity at the geometric center of the foam plastic material for mounting or containing an explosive and the cap section has a relief valve for relieving any pressure that may be in the cavity of the bottle.

4 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SAFETY CONTAINER FOR TRANSPORTING SMALL QUANTITIES OF EXPLOSIVES

DEDICATORY CLAUSE

The invention described herein may be manufactured, used, and licensed by or for the Government for governmental purposes without the payment to me of any royalties thereon.

BACKGROUND OF THE INVENTION

In the past, adequate means for transporting explosives so that the explosive can be transported at a reasonable price has not been available. Laboratories and other agencies need explosive materials in the performance of their duties. Often, this need requires only a few grams of the explosive and may in some instances require less than one gram. Since special shipping is required to maintain safety, the cost of shipping explosives can be several hundred dollars, even for fraction gram weights. Therefore, there is a need for a safe shipping container in which small quantities of explosives can be shipped safely and by common conveyances.

Accordingly, it is an object of this invention to provide a container in which small quantities of explosives can be shipped safely by common conveyance even if the explosive is detonated.

Another object of this invention is to provide a shipping device in which reduced cost in shipping can be appreciated.

Still another object of this invention is to provide an explosive shipping device which insures complete safety even if the explosive is detonated high-order.

Still another object of this invention is to provide a container in which the explosive is so removed from the walls of a main container that the main container is protected from the shock waves produced by the detonation of the explosive.

A still further object of this invention is to provide a container for transporting explosives in which a main container has a foam material therein with the explosive mounted within the foam material in such a manner that the foam material will absorb the explosive forces of the explosive if the explosive is detonated.

Other objects and advantages of this invention will be obvious to those skilled in this art.

SUMMARY OF THE INVENTION

In accordance with this invention, a safety container for transporting small quantities of explosives is provided in which a main tank has an internal chamber therein and a foam material is positioned inside the chamber of the main tank and the foam material has in the center thereof a chamber in which an explosive of small quantity can be positioned and safely carried therein for transporting from one location to another even if the explosive is accidentally set off.

DESCRIPTION OF THE PREFERRED EMBODIMENT

Figure 1:
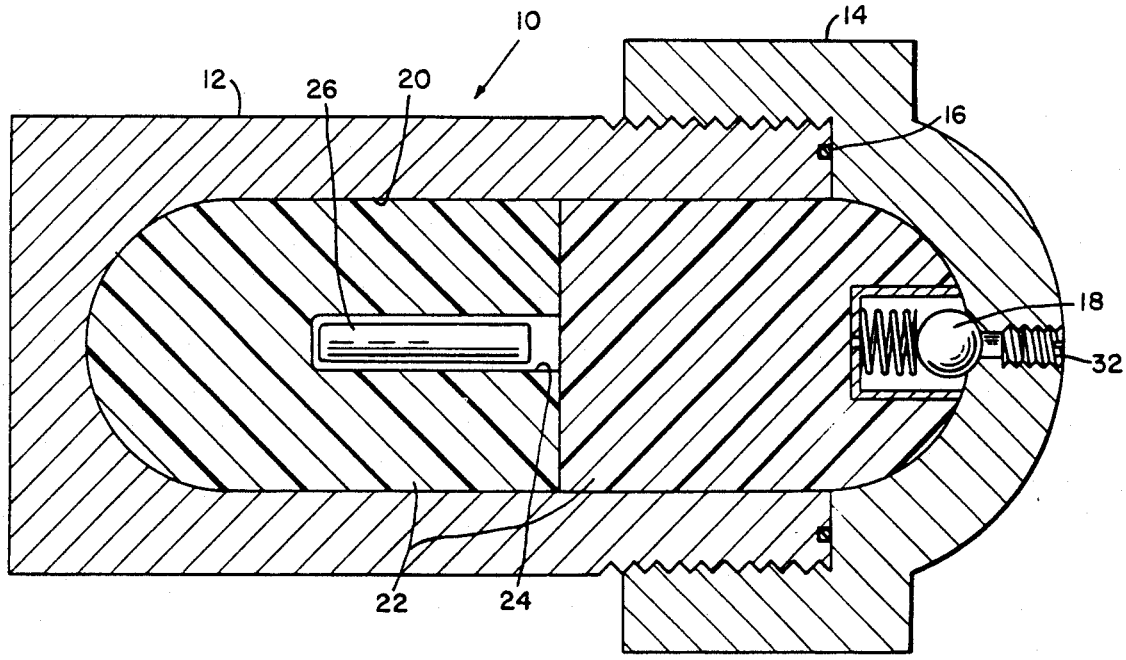
FIG. 1 is a sectional view of a safety container in accordance with this invention.
Figure 2:
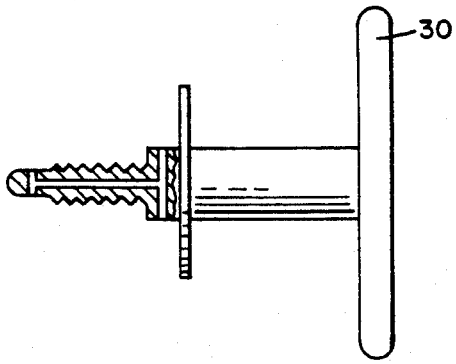
FIG. 2 is a sectional view of a tool that can be used with the safety container of this invention.

Referring now to the drawings, a high strength metal bottle 10 of a material such as maraging steel has a bottom cavity section 12 with a screw-on cap section 14 with an o-ring seal 16 between the joint formed between bottom section 12 and cap 14. Cap 14 has a spring loaded ball type relief valve 18 mounted therein for the relief of pressure in bottle 10. Bottle 10 has an internal free volume in the form of chamber 20 with the volume of chamber 20 being sufficient to contain the gas pressure of the explosive after an explosion has occurred. This gas pressure from the explosive is not the detonation pressure of the explosive but that pressure which exists when an explosive is turned to gaseous product, at the flame temperature of the explosive, and occupies the free volume of the chamber of the container. A safety factor for wall thickness of container 10 can be 10 to 20 times that needed to contain the pressure of the gaseous products from any explosion and these wall thicknesses can be used without being weight prohibitive in the container. Container 10 has a rigid foam 22 therein that fills chamber 20 and provides a volume or cavity in approximately the geometric center thereof for mounting or containing the explosive therein. The rigid foam can be polystyrene, polyurethane, polyethylene, etc., and can be treated or of electrically conductive materials which will not generate an electrostatic charge. The density of the foam used should be such that when fully compressed (that is removal of gas voids) it occupies no more than 5% of the high pressure volume of chamber 20. Cavity 24 inside rigid foam 22, which cavity is located appoximately at the geometric center of rigid foam 22, is where explosive 26 is placed. Explosive 26 can be contained in a thin wall, lightweight package such as aluminum, plastic, glass, or metal foil. This inner package for the explosive is shaped such that no dimples, cones, or other jet forming shapes are formed. Pressure vessel 10 is metallic and forms a complete faraday shield which precludes accidental initiation by electrostatic or other electrical means.

There is no reason for accidental detonation of explosive 26 to occur, but if for any reason detonation does occur, applicant's container arrangement prohibits damage outside pressure vessel 10. If detonation occurs, foam material 22 in concert with the location of explosive 26 with respect to the vessel's walls causes attenuation of the detonation shock waves to a level below the rupture pressure of container 10.

If detonation occurs, tool 30 is used for relieving the pressure in container 10 by unscrewing plug 32 from cap 14 and screwing tool 30 into the opening through cap 14 to unseat the ball valve of assembly 18 against the action of the spring to allow the pressure inside chamber 20 to be bled off and relieve the pressure to enable cap 14 to be separated from cylinder portion 12.

The uniqueness of this invention is due to the fact that the explosive 26 is always removed from the walls of the pressure vessel forming chamber 20 by foam insert 22. The foam insert also acts to attenuate any explosive forces. This off-set distance of the explosive and attenuating action by the foam reduces any shock waves to acceptable values. It will be appreciated that this container has the advantage of enabling explosives to be shipped by conventional carrier, which not only reduces cost but also conserves fuel energy sources by eliminating special vehicular conveyance.

Tests on the device have been made and explosives from 5.5 grams to 11.3 grams have been tested and the container has been found to operate very successfully as intended with no problems. These tests were conducted using a metal container with an inside diameter of 2.5 inches, a length of 4.625 inches, an outside diameter of 4 inches and a volume of 22.7 cubic inches. The wall thickness of the container was 0.75 inches. On explosion, the foam material was reduced in volume within the desired specification.

I claim:

1. A safety container for transporting small quantities of explosive and comprising a high strength metal bottle having a bottom section and a top cap section with said sections being removably secured together and sealing means sealing between the bottom section and the cap section, a cavity defined in said bottle and a rigid foam material mounted in said bottle and filling said cavity, said foam material having a cavity at approximately the geometric center of the foam material for containing a small container of explosive therein, and said cap having a relief valve means therein for relieving any pressures that may be formed inside the bottle, said rigid foam material being of such a material that when fully compressed it occupies no more than 5 percent of the volume of the cavity in the metal bottle.

2. A safety container for transporting small quantities of explosives as set forth in claim 1, wherein said valve means is a ball valve that is spring biased to a closing position and said cap having a port therethrough with a removable plug in said port for allowing a tool to be inserted through said port to unseat said ball valve.

3. A safety container for transporting small quantities of explosives as set forth in claim 2, wherein said rigid foam material is selected from the group consisting of polystyrene, polyurethane and polyethylene.

4. A safety container for transporting small quantities of explosives as set forth in claim 3, wherein said rigid foam material is such that it will not generate an electrostatic charge.

* * * * *